May 19, 1964 L. I. GOLDFISCHER 3,134,102
AIRCRAFT DOPPLER MEASURING SYSTEM
Filed Feb. 28, 1958 5 Sheets-Sheet 1

INVENTOR.
LESTER I. GOLDFISCHER
BY
ATTORNEY.

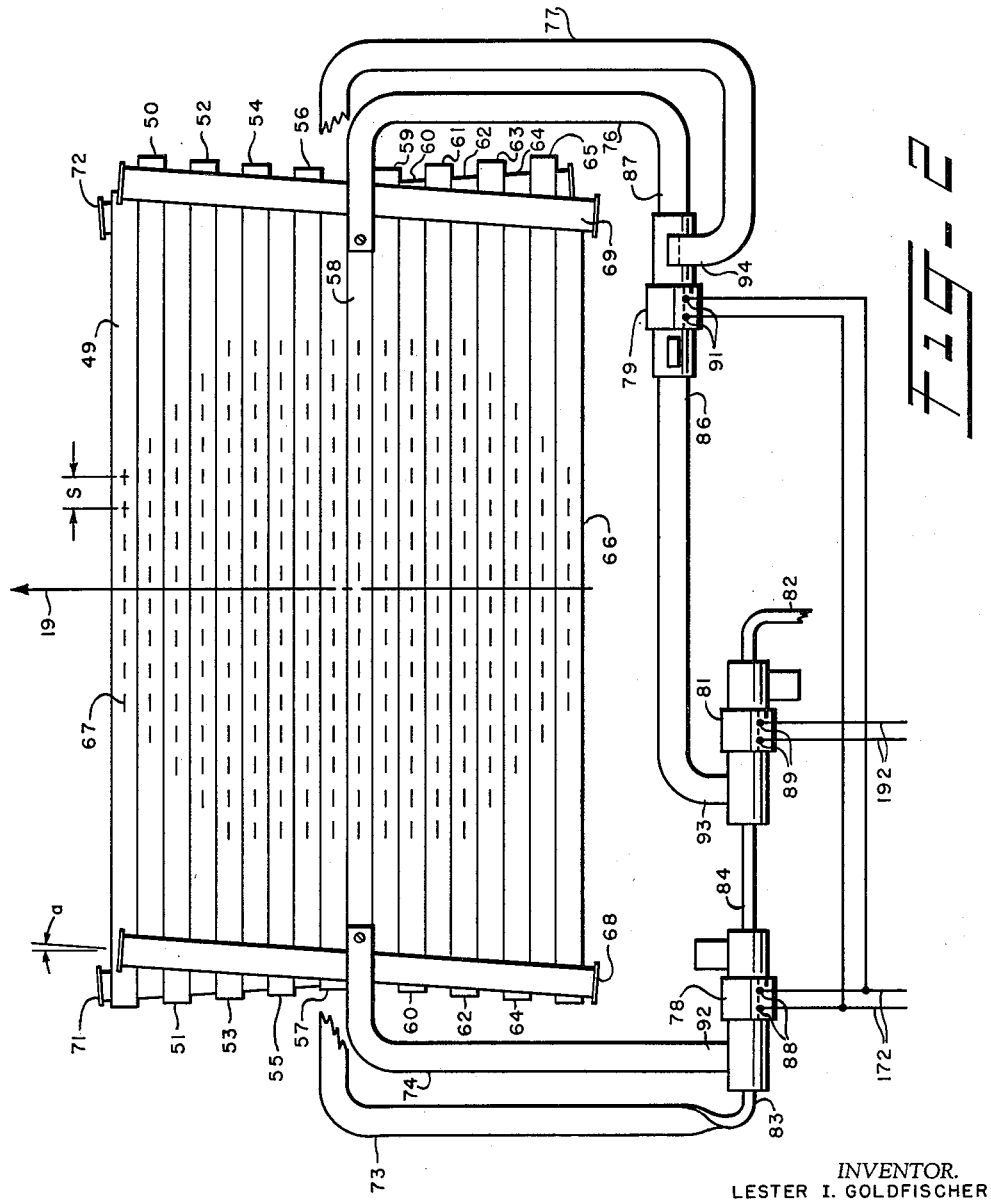

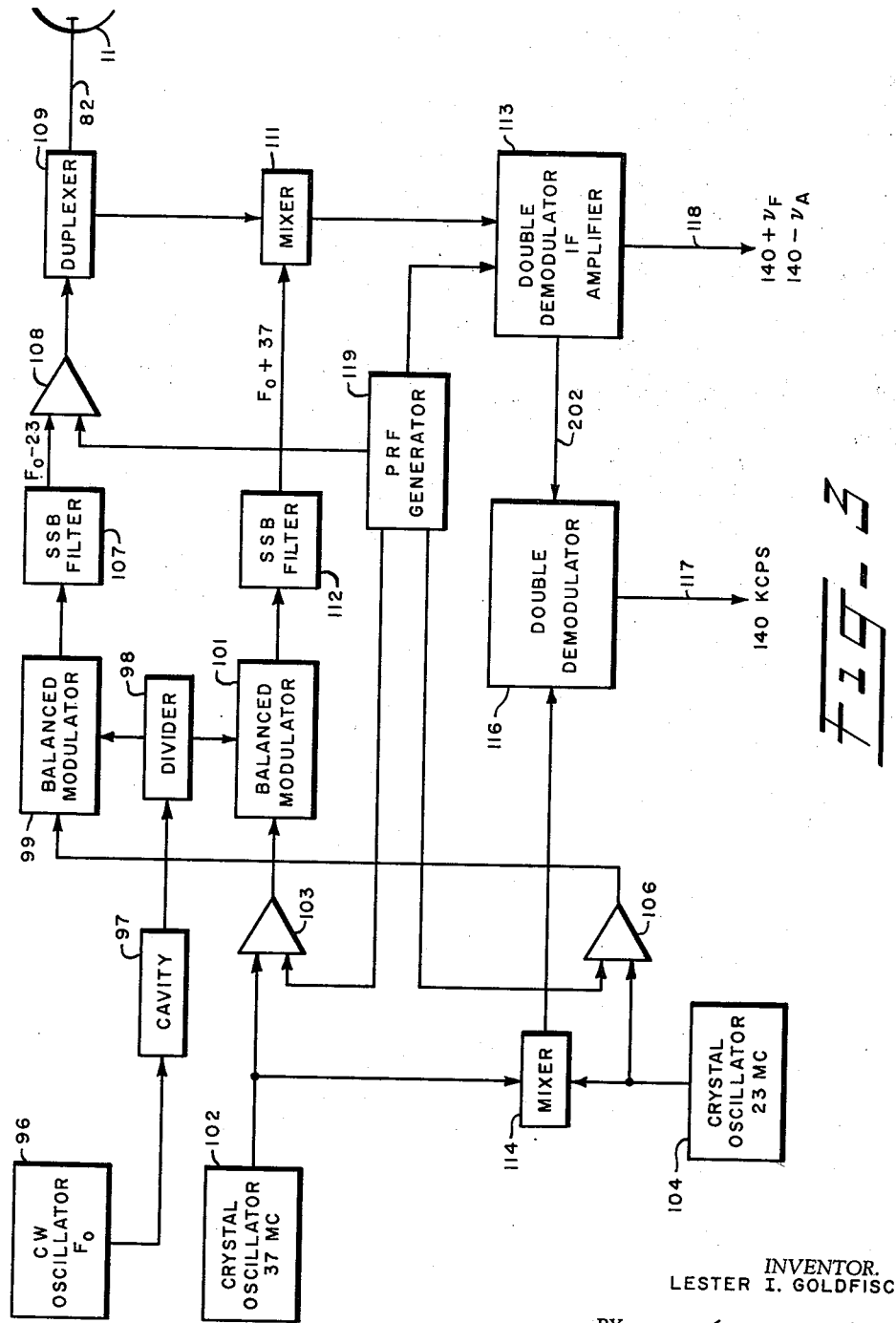

INVENTOR.
LESTER I. GOLDFISCHER
BY
ATTORNEY.

May 19, 1964  L. I. GOLDFISCHER  3,134,102
AIRCRAFT DOPPLER MEASURING SYSTEM
Filed Feb. 28, 1958
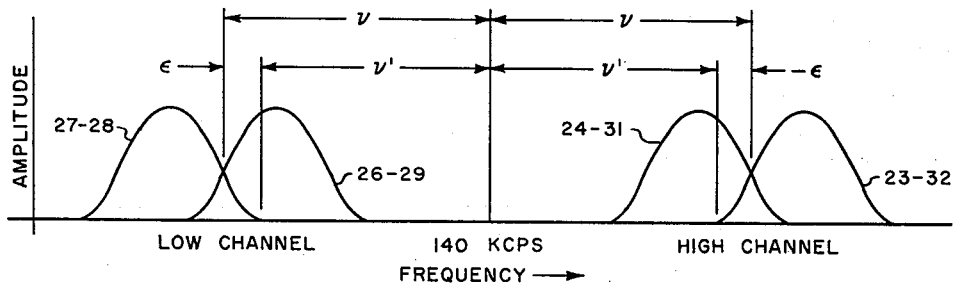
_Fig-5_
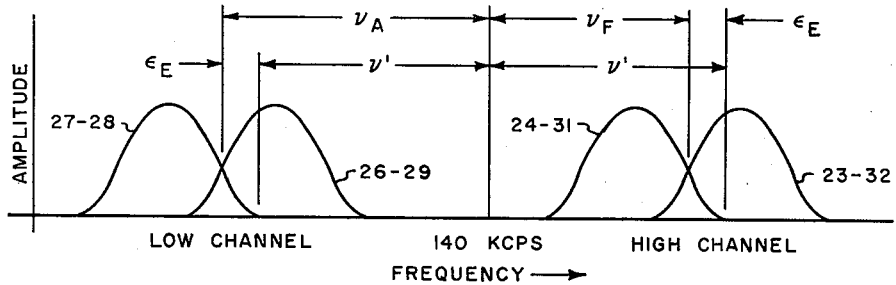
_Fig-6_
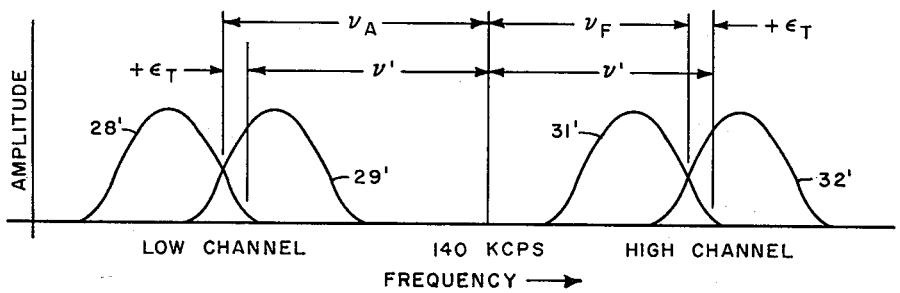
_Fig-7_
INVENTOR.
LESTER I. GOLDFISCHER
BY
ATTORNEY.

United States Patent Office 3,134,102
Patented May 19, 1964

3,134,102
AIRCRAFT DOPPLER MEASURING SYSTEM
Lester I. Goldfischer, New Rochelle, N.Y., assignor to General Precision, Inc., a corporation of Delaware
Filed Feb. 28, 1958, Ser. No. 718,376
17 Claims. (Cl. 343—9)

This invention relates to aircraft Doppler microwave systems and particularly to such systems which measure ground speed, drift angle and vertical speed of the aircraft.

The invention provides a self-contained microwave beam system which produces data necessary for accurate dead reckoning navigation and other purposes. Its output consists basically of signals representing aircraft speed and heading referred to the direction of its velocity. These outputs permit measurement not only of the aircraft's ground track speed and drift angle, but also of the vertical component of speed when it is diving or climbing. The outputs are substantially free from errors due to transmitting frequency variations, altitude hole effects and water reflection effects.

The invention is characterized by employment of an antenna stabilized to the aircraft velocity direction instead of to the horizontal direction parallel to the aircraft ground track as is usually the case. The antenna emits four beams of microwave energy, resulting in considerable redundancy of input data since only three beams are necessary to secure complete data. This is advantageous when, due to the nature of the terrain or other reasons, only three beam echoes are received. The invention is also characterized by the use of successive pulses of microwave energy which are time-coherent. The pulses are frequency-modulated, resulting in still more nearly complete freedom from errors due to altitude hole and sea reflection effects. The system outputs are derived in a frequency tracker, a usual component of such systems for finding and measuring the mean frequency of the Doppler difference frequency spectrum.

Several components of the subject system have been described and claimed elsewhere, for example:

Apparatus for Measuring Doppler Frequency Differences, by Gus Stavis; U.S. patent application Serial No. 592,054, filed June 18, 1956, now U.S. Patent No. 3,113,-308.

Microwave Antenna, by Richard H. Rearwin, U.S. patent application No. 690,883, filed October 15, 1957, now U.S. Patent No. 2,967,301.

Microwave Receiver-Transmitter, by Leonard O. Vladimir, U.S. patent application Serial No. 696,872, filed November 15, 1957.

Water reflection and altitude hole effects are mitigated by the use of dual beams. It has been found that when microwave radio energy is reflected from a water surface the amount of energy returned to the receiver-transmitter depends not only on the distance but also on the angle of incidence at the water, being much reduced at acute angles. This is termed the water reflection effect. When pulsed microwave echoes are received by the receiver-transmitter, the receiver being gated off during transmission, those parts of the echoes are lost which arrive at the receiver when it is gated off. This is termed the altitude hole effect.

Both the altitude hole effect and the water reflection effect cause signal reduction and, what is more important, cause errors in the Doppler information contained in the echoes. These errors come about by selective attenuation of frequencies composing the Doppler spectrum. Both types of error are observed as an apparent change in the receiver-transmitter calibration, this apparent change being termed calibration shift. For instance, if the device is part of an aircraft navigation instrument measuring aircraft speed along its ground track, the ratio between the Doppler frequency and the speed is termed the calibration constant. Apparent changes in it due to these effects are termed calibration shifts. These shifts can amount to as much as 5% and so are by no means negligible.

The use of dual lobe beams of microwave radiation substantially reduces calibration shifts due to altitude hole and water reflection effects. Additionally, the dual lobe beams provide dual input signals which enable the frequency tracker to perceive the directions of its loop errors.

The components required to instrument this system include a planar microwave antenna having its fore-and-aft or major axis slaved or stabilized to the direction of aircraft velocity. The antenna emits four dual beams in selected time sequences and receives and passes to the receiver-transmitter eight signals, differing in timing and frequency, representing echo radiations of the eight lobes.

The receiver-transmitter generates continuous-wave (CW) microwave energy, amplifies and gates or pulses it and transmits the pulse signals to the antenna for radiation. Received signals from the antenna are coherently demodulated and amplified in a double-demodulation intermediate-frequency amplifier. The output is transmitted as a two-frequency signal to a dual frequency tracker.

The dual frequency tracker is of the zero-frequency resonant discriminator type. It derives information from this two-frequency input signal which it emits in the form of three signals representing aircraft speed in the velocity direction, deck pointing error of the antenna and elevation pointing error. The angular outputs are employed to servo the antenna to the velocity direction.

The purpose of this invention is to provide a microwave system including a frequency tracker to measure aircraft horizontal and vertical velocities and angles with high accuracy.

A further understanding of this invention may be secured from the detailed description together with the drawings, in which:

FIGURE 2 depicts the antenna used by the system.

FIGURE 3 is a block diagram of the receiver-transmitter.

FIGURES 5, 6, 7 and 8 are graphs illustrating the operation of the system.

Figure 1:
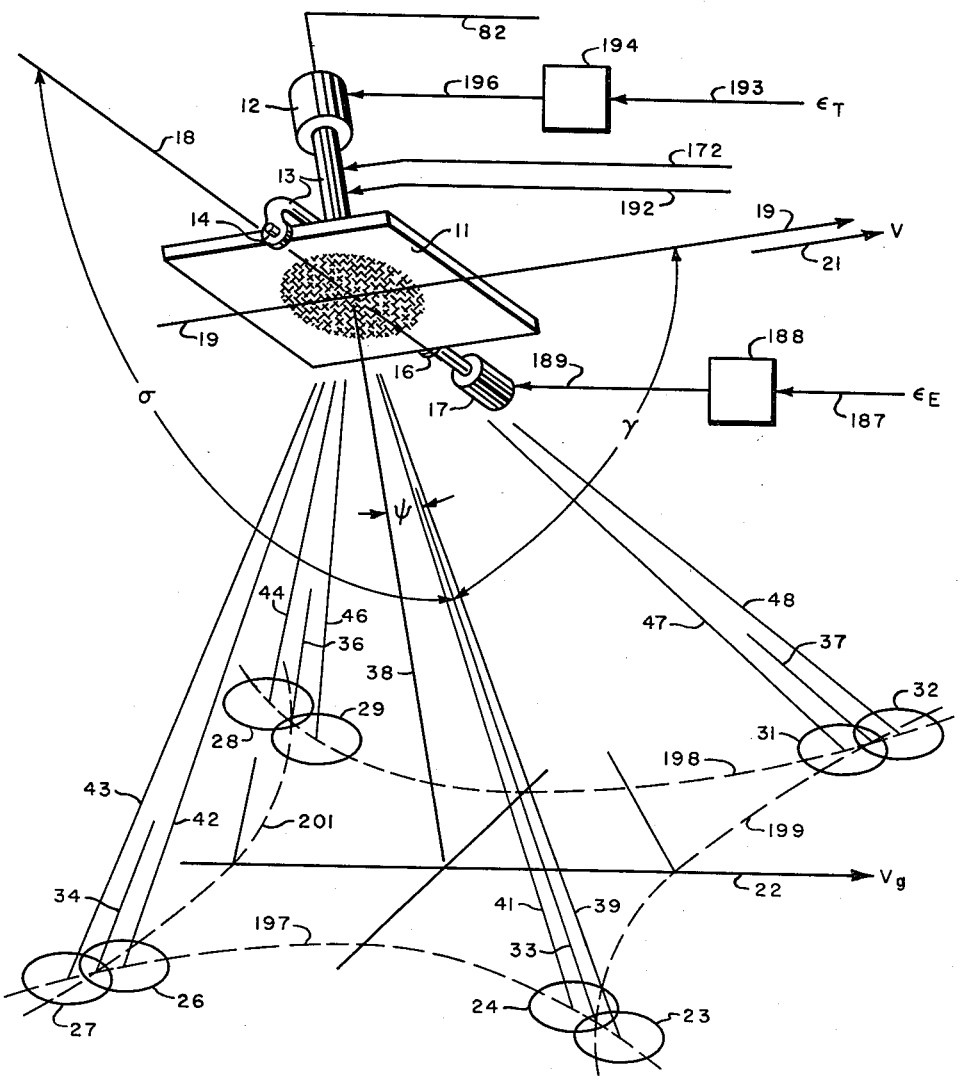
FIGURE 1 illustrates the microwave beams and lobes employed by this system.

Referring now to FIG. 1, a planar array antenna 11 is supported in an aircraft by an outer deck plane bearing diagrammatically represented by bearing 12 and the forked support member 13, the bearing 12 being secured to the airframe and containing a motor for positioning the antenna to a desired angle in a plane parallel to the aircraft's longitudinal and transverse axes. The antenna is also journalled at pivots 14 and 16 in the fork 13, and a motor 17 is provided for inclining the antenna in the elevation direction. The antenna's transverse axis 18 connects pivots 14 and 16. The antenna's fore-and-aft or major axis 19 is shown pointing in the direction of the aircraft's velocity denoted by the arrow 21. Aircraft speed in direction 21 is denoted by the term V.

The drawing shows the direction of aircraft motion to include a small climb angle, but the range of direction is unlimited except that all of the radiated beams of microwave energy must point toward the earth. The line 22 represents the horizontal ground track.

The antenna emits four dual beams of microwave radiation each consisitng of two intersecting lobes. These eight lobes irradiate the earth at the positions indicated by the circles 23, 24, 26, 27, 28, 29, 31 and 32. The lines 33, 34, 36 and 37 drawn from the antenna to the circle intersections generally represent the four beams. The angle from the major axis 19 of the antenna to each of the beams is termed the beam γ (gamma) angle, from transverse axis 18 to each beam or lobe the σ (sigma) angle, and from the axis 38 perpendicular to the array to each beam the ψ (psi) angle. The antenna is so designed that all four γ angles are equal, all four σ angles are equal, and all four ψ angles are equal. Also the eight σ angles are alike from the transverse axis 18 to the eight lobes 39, 41, 42, 43, 44, 46, 47 and 48, these lines generally indicating the lobes being drawn from the antenna to the centers of the eight circles of ground illumination.

The lobes are radiated in pairs and the pairs are alternated at two rates in sequence. Starting with the fore lobe 39 and aft lobe 42 on the right, this pair is radiated alternately with pair 41 and 43 at the lobing rate of 100 c.p.c. After ten cycles the radiation is switched to the left side, where lobes 48 and 46 form a pair radiated together, alternating with lobes 47 and 44 at 100 c.p.s. and continuing for ten cycles. The radiation is then again switched to the right side. The right-left or beaming switching is thus at the rate of 5 c.p.s.

The construction of antenna 11 including switches to generate and alternate these beams and lobes is depicted in FIG. 2. A plurality of linear arrays, for example 18 arrays 49 to 66 inclusive, are arranged parallel with broad sides planar. Radiators such as broad side shunt slot 67 are arranged to occupy roughly a circular area. All 18 linear arrays are closed at both ends by tapered metal plugs. Each is connected near each end to a feed waveguide, there being two waveguides 68 and 69 positioned on the radiating surface side connected to both ends of linear arrays 50, 52, 54, 56, 58, 60, 62, 64, and 66. Two more feed waveguides 71 and 72 are positioned on the other side of the planar array and are connected to both ends of the remaining linear arrays. The four feed waveguides are center fed by the four connecting waveguides 73, 74, 76 and 77 and their ends are terminated in metal plugs.

All linear arrays are alike except for the number of radiators. In all of the arrays the radiator spacing is $s$, which is selected to provide successive equal differences of $$\frac{\pi}{2}$$

radians in the phases of microwave energy applied to successive radiators from the feed waveguides. All radiator couplings in each array and in all arrays are of the same sense and magnitude, so that all arrays are inphase resonant arrays with exponential illumination.

In place of shunt slots any other type of radiator may be used. In particular, any type providing circular polarization provides considerable immunity from raindrop scatter, and is therefore advantageous. The four feed waveguides are positioned at about 3½ degrees from normality to the linear arrays, feed waveguides 68 and 69 being slanted in one direction and the others in the other direction. This produces slight feed phase differences resulting in the splitting of each beam into two lobes.

The connecting waveguides 73, 74, 76 and 77 are connected to feed the feed waveguides by means of matched transitions. Connecting waveguides 73 and 74 are connected at their other ends to a ferrite switch 78 and connecting waveguides 76 and 77 are connected to ferrite switch 79. Switches 78 and 79 are connected to a third switch 81, the rectangular guide terminal 82 of which constitutes the antenna microwave terminal.

The ferrite switches 78, 79 and 81, when their direct-current terminals 88, 89 and 91 are not energized, provide microwave paths between terminals 84 and 83, 82 and 84, and 86 and 87. When the direct-current terminals are energized these microwave paths are blocked and three other paths are opened between microwave terminals 84 and 92, 82 and 93, and 86 and 94. Ferrite switch energizing terminals 88 and 91 are connected through conductors 172 to a 100 c.p.s. generator 173, FIG. 4. The terminals 89, FIG. 1, are connected through conductors 192 to a 5 c.p.s. generator 163, FIG. 4.

The antenna 11, FIG. 1, is connected by means of microwave guide 82 to a receiver-transmitter shown in the block diagram of FIG. 3. In this figure a continuous-wave (CW) oscillator 96 is associated with a high-Q cavity 97 for constant-frequency output at a frequency $F_0$ which may be, for example, 13.5K mc. p.s. The output is applied to a power divider 98 which divides the power between two balanced modulators 99 and 101. A stable crystal oscillator 102 having a frequency of 37 mc.p.s. has its output amplified by amplifier 103 and applied to modulator 101. A second stable crystal oscillator 104 having a frequency of 23 mc. p.s. has its output amplified by amplifier 106 and applied to balance modulator 99. The output thereof is applied to a single sideband filter 107 which attenuates the upper sideband and passes the lower sideband having a frequency of $F_0-23$, or 13,477 mc. p.s. This sideband is amplified in amplifier 108 and passed through a duplexer 109 and waveguide conductor 82 to antenna 11.

The echo signals from antenna 11 are transmitted through waveguide 82 and duplexer 109 to a microwave mixer and demodulator 111. The output of balanced modulator 101 is applied to a single sideband filter 112 which attenuates the lower sideband and passes the upper sideband having a frequency of $F_0+37$, or 13,537 mc. p.s. The sideband having this microwave frequency, termed the pseudo local oscillator frequency, is applied to mixer 111. The output frequency of mixer 111 is the difference of the spectrum of frequencies applied from the duplexer and of the pseudo local oscillator frequency, and has a center frequency of approximately 60 mc. p.s., modulated by the several Doppler difference frequencies. This output is applied to an intermediate-frequency (IF) amplifier 113 which emits a signal having two spectra with center frequencies of 140 kc. p.s.$+\nu_F$ and 140 kc. p.s.$-\nu_A$, in which $\nu_F$ and $\nu_A$ are Doppler difference frequencies.

The two heterodyning oscillators which are required in the IF amplifier are also employed to generate a pure 140 kc. p.s. frequency output. The outputs of crystal oscillators 102 and 104 are modulated in mixer 114 and their sum product having a frequency of 60 mc. p.s. is applied to a double demodulator 116 which employs the outputs of the heterodyne oscillators of amplifier 113 to demodulate to 140 kc. p.s. Thus the three outputs of the receiver-transmitter at the two conductors 117 and 118 are coherent with each other.

A pulse repetition frequency (PRF) generator 119 has a median frequency of 500 kc. p.s. and a trapezoidal waveform. It is frequency modulated at a rate of 150 c.p.s. over a ±20% frequency excursion with a triangular waveform to reduce the effect of altitude holes. The output of this generator is applied in a selected phase to gate or pulse both of the transmitting amplifiers 108 and 106, thus securing pulsed microwave transmission. The same PRF output, but having opposite phase, is applied to the IF amplifier 113 and to amplifier 103 in order to gate or disable the receiver during transmission.

Figure 4:
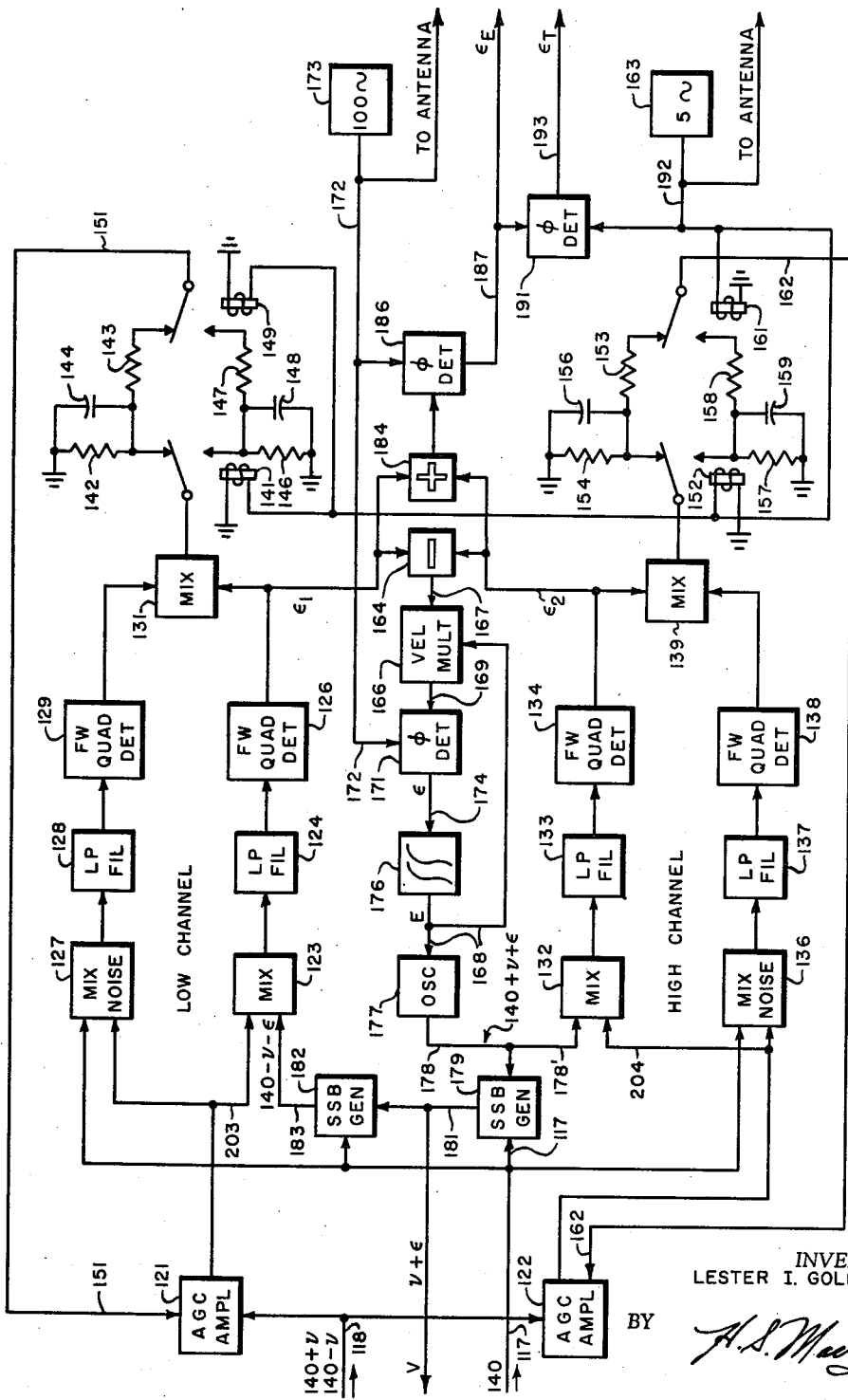
FIGURE 4 is a block and schematic diagram of the frequency tracker.

The frequency tracker shown in block and schematic form in FIG. 4 receives its signal input on conductor 118 from the receiver, FIG. 3. The frequency tracker contains two identical discriminators, both of which receive the same composite input signal containing the two Doppler frequency spectra. The low channel discriminator consists of automatic gain control (AGC) amplifier 121, mixer 123, low-pass filter 124 and full wave quadratic detector 126, all connected in cascade. A noise channel is provided consisting of mixer 127, low-pass filter 128, full wave quadratic detector 129 and mixer 131.

The other or high channel discriminator is identical, consisting of AGC amplifier 122, mixer 132, low-pass filter 133 and full wave quadratic detector 134. Its noise channel consists of mixer 136, low-pass filter 137, full wave quadratic detector 138 and mixer 139.

The output of mixer 131, being a signal from which most of the noise has been extracted, is modulated at beaming frequency in relay 141, integrated in separate integrators consisting during one beaming half cycle of resistors 142 and 143 and capacitor 144, and during the other half cycle of resistors 146 and 147 and capacitor 148, and demodulated by relay 149. The output is fed back through conductor 151 to control the AGC amplifier 121. Thus although the integrators have time constants of several seconds, the control potential in conductor 151 is direct current at two levels alternating at 5 c.p.s. This control signal thus maintains constant AGC amplifier output when the condition exists of unequal reflectivities of the right and left beams.

The high channel AGC control circuit is identical with that of the low channel, and consists of modulating relay 152, an integrator including resistors 153 and 154 and capacitor 156, an integrator including resistors 157 and 158 and capacitor 159, and demodulating relay 161. The output control potentials are applied through conductor 162 to amplifier 122. All four relays are operated at 5 c.p.s. from a 5-cycle generator 163.

The outputs of detectors 126 and 134 consists of error signals termed $\epsilon_1$ and $\epsilon_2$. They are subtracted in a subtracting circuit 164 and the difference is applied to a velocity multiplying circuit 166. The purpose of this circuit is to multiply the difference by a factor proportional to the aircraft velocity. The difference signal is represented by a potential in conductor 167 while the multiplying factor is represented by a direct potential in conductor 168. The output of the velocity multiplying circuit is a potential in conductor 169.

This output potential is phase detected in a phase detector 171 to which is applied a reference phase voltage through conductor 172. The reference phase is the phase of a 100 c.p.s. square wave potential generated in generator 173. This generator also supplies power to actuate the lobing antenna switches 78 and 79, FIG. 2, at the same frequency and phase.

The output of phase detector 171 in conductor 174 is a direct current error signal representing by its magnitude the aircraft velocity loop error and by polarity the error sense. This signal is doubly integrated in integrator 176 to form a direct potential in conductor 168 approximately representing by its magnitude E the aircraft speed. At least one of the integrators 176 employs feed-forward damping to insure loop stability. This potential E is fed back through conductor 168 to velocity multiplying circuit 166. Potential E, being approximately representative of aircraft speed V in the direction of its velocity, may be used as a system output.

An oscillator 177 may consist of a multivibrator linearly controllable in frequency by direct potential E applied at input 168. Its output at conductor 178 has a frequency which equals the base reference frequency of 140 kc. p.s. plus the average Doppler difference frequency $\nu$ plus a frequency $\epsilon$ representing the loop error, or $140+\nu+\epsilon$. This signal is applied to a single-sideband generator 179 which may, for example, consist of a mixer-modulator followed by a filter to transmit only the difference sideband. To it is applied from conductor 117 the base reference frequency signal from the receiver, FIG. 3, as heterodyning input. The output signal at conductor 181 has a frequency of $\nu+\epsilon$ and is employed as the system output having a frequency exactly representative of aircraft speed $\nu$ when the loop error, $\epsilon$, is zero.

The output of single-sideband generator 179 is also applied to a second single-sideband generator 182 also receiving the 140 kc. p.s. base reference frequency signal as its heterodyning signal. Again the lower sideband is transmitted, having a frequency of $140-\nu-\epsilon$.

The combination of oscillator 177 with single-sideband generators 179 and 182 thus constitutes a generator of two signals having frequencies which are under all conditions exactly symmetrical above and below the base reference frequency of 140 kc. p.s. These two signals are applied through conductor 178' to the high channel mixer 132 and through conductor 183 to the low channel mixer 123 respectively.

The output error signals $\epsilon_1$ and $\epsilon_2$ of detectors 126 and 134 are additionally applied to a summing circuit 184. The sum output signal is applied to a phase detector 186 to which the 100 c.p.s. output of generator 173 is also applied as phasing reference. The output at conductor 187 is a signal $\epsilon_E$ representing by its magnitude and polarity the angular elevation pointing error of the antenna 11, FIG. 1. This error is explicity the error at elevation bearings 14 and 16 in the alignment of the antenna major axis 19 to the aircraft velocity direction 21. The error signal $\epsilon_E$ is a frequency tracker and system output. It is also applied, through a servomechanism 188 and conductor 189, to the antenna elevation motor 17 to align the antenna to the velocity direction.

The error signal $\epsilon_E$ is additionally applied to a phase detector 191, FIG. 4, to which is applied as phasing reference the output of the 5 c.p.s. square wave generator 163 through conductor 192. The output of generator 163 is also applied to the antenna switches, as indicated by conductors 192, FIGS. 1 and 2, to switch the microwave beams to right and left. The output of phase detector 191, FIG. 4, is a train error signal $\epsilon_T$ in conductor 193. This signal is a system output and represents the antenna angular pointing error in the aircraft deck plane. The signal is also applied through a servomechanism 194, FIG. 1, and conductor 196 to the train gimbal motor 12 to align the antenna major axis 19 in the deck plane to the direction 21 of the aircraft's velocity.

Operation of the antenna depicted in FIG. 2 to generate the lobes and beams shown in FIG. 1 is as follows. The 18 linear arrays, 49 to 66, run transversely and are designed to emit inphase beams downward at an angle $\sigma$ in a direction slanting away from the feed end. Each linear array considered by itself would emit a cone having a half angle $\sigma$ and intersecting the earth in a hyperbola, such as hyperbolas 197 and 198, FIG. 1.

The feed waveguides 68, 69, 71 and 72, FIG. 2, run generally in the direction of the major axis 19. Each may be considered to be a linear array of elements, each element being one of the connected transverse linear arrays. The feed waveguide considered as a linear array has an element phase spacing of $\pi$ and may be thought of as a combination of an inphase and antiphase array, emitting two cones simultaneously forward and backward, each having a half angle of $\gamma$, and each made up of equal parts of inphase and antiphase radiation, thus providing frequency compensation in the major axis direction. These cones intersect the earth in hyperbolas 199 and 201, FIG. 1.

The actual radiation is a simultaneous combination of the longitudinal and transverse cones. Since these radiations are in phase only at narrow (4°) beams in their intersections, these narrow beams are the only parts of the cones that are radiated.

This description has been on the basis that the feed waveguides are perpendicular to the linear arrays. However, the feed waveguides are actually canted at an angle $a$ of about 3½° to the normal line. The phases of the feeds to be individual radiators of the linear arrays are thus progressively advanced or delayed which in turn changes the $\gamma$ angles of the emitted beams, the $\sigma$ angles being unchanged. The amount of change is in accordance with the equation $$\cos \gamma = \frac{\lambda(1+\sin a)}{2s} \qquad (1)$$

in which λ is the microwave length in space, $a$ is the cant angle, here 3½°, and $s$ is the distance between radiators.

The three ferrite switches 78, 79 and 81, FIG. 2, contain dissipative terminations and in any combination of switch positions terminate non-reflectively the ends of linear arrays opposite their feed ends. Also, when odd-numbered linear arrays are in operation both ends of the non-operating even-numbered linear arrays are non-reflectively terminated, and vice versa.

In the complete operation of the antenna with all switches, unoperated, microwave energy applied at terminal 82, FIG. 2, through connecting waveguide 73 energizes feed waveguide 71 and all odd-numbered linear arrays. This in FIG. 1 illuminates only the lobes 32 and 29 of left beams 36 and 37. When switches 78 and 79, FIG. 2, are energized the microwave transmitting energy is switched to feed waveguide 68 and the even waveguides and illumination is transferred to areas 31 and 28, FIG. 1. When all three switches are operated the energy is transmitted through waveguide 93, FIG. 2, and waveguide 77 to feed waveguide 72, illuminating ground areas 23 and 26, FIG. 1. When only switch 81, FIG. 2, is energized the ground areas 24 and 27, FIG. 1, are illuminated.

At any instant the microwave echo energy received by the antenna contains two spectra, one having a central frequency which is the transmitting microwave frequency, $F_t$, plus the Doppler difference frequency, $\mu_F$, of a forward ground area echo, and the other having a central frequency which is the transmitting frequency minus the Doppler difference frequency, $\mu_A$, of an aft ground area echo. The composite received signal $F_R$ may be described as $$F_R = F_t \pm \mu \quad (2)$$

the sum and difference Doppler frequencies being termed $\pm \mu$. The transmitted frequency, $F_t$, is $$F_t = F_o - 23 \quad (3)$$

in which $F_o$ is the frequency of CW oscillator 96, FIG. 3, and 23 represents the 23 mc. p.s. offset frequency of crystal oscillator 104.

The received signal of frequency $F_R$ is mixed and heterodyned in mixer 111 with the pseudo local oscillator signal having a frequency of $F_o + 37$, and the difference sideband is selected having a frequency of 60 mc. p.s. $\pm \mu$. This signal is amplified in IF amplifier 113 and heterodyned by an oscillator having a frequency of 51 mc. p.s. The difference product having a frequency of 9 mc. p.s. is selected, amplified and heterodyned by an oscillator having 8.86 mc. p.s. frequency. The difference product having a center frequency of 140 kc. p.s. is selected and transmitted through the single conductor 118 to the frequency tracker which follows. The difference product contains two Doppler difference frequency spectra. The higher frequency spectrum is derived from a forward beam and has the frequency of 140 kc. p.s. $+\mu_F$, and the lower frequency spectrum, derived from an aft beam, has the frequency of 140 kc. p.s. $-\mu_A$.

Outputs of the 51 mc. p.s. and 9 mc. p.s. oscillators are also applied to the double demodulator 116 through the path 202 to form a 140 kc. p.s. output in conductor 117, so that this signal is coherent with the Doppler signal output in conductor 118.

The Doppler frequency, $\mu$, contained in a microwave beam echo signal is related to the microwave free space wavelength as transmitted and the aircraft speed, V, in the direction of its velocity by the expression:

$$\nu = \frac{2V}{\lambda} \cos \theta \quad (4)$$

The angle $\theta$ is that between the beam direction and the velocity direction, as, for example, in FIG. 1 the angle between the beam 33 and the arrow 21. When the antenna's major axis 19 coincides with the velocity direction 21 the Equation 4 becomes $$\nu = \frac{2V}{\lambda} \cos \gamma \quad (5)$$

In FIG. 1 it will be observed that the gamma angles of the two intersecting lobes forming a dual beam are different, so that the mean Doppler difference frequencies of the two lobes are always different. However, considering the mean beam gamma angles and the Doppler frequencies $\mu$ dependent upon them, when the antenna is exactly aligned to direction 21 the right and left Doppler returns are equal and the fore and aft Doppler returns are equal but of opposite sign. When, however, the antenna is misaligned, in general the Doppler frequencies $\mu$ of the four beam echoes are all different.

It will be shown that from these four generally different Doppler frequencies are derived the frequency tracker output signals V, $\epsilon_E$, and $\epsilon_T$. From these quantities and heading reference and other data can be calculated numerous other quantities including ground speed, drift angle, climb angle and vertical velocity. Such calculations can be automatically performed by various computers the design of which is outside of the scope of this invention.

FIGURE 5 is a graph representing the signal spectra applied through conductors 203 and 204 to the mixers 123 and 132, FIG. 4, when the antenna is perfectly aligned so that $\epsilon_E$ and $\epsilon_T$ are zero, but when a velocity error $\epsilon$ exists. Referring to FIG. 4, the lower Doppler input signal, 140—$v$, at conductor 118 and applied to the low channel discriminator at conductor 203 actually contains two intersecting spectra since the beam spectrum is actually made of the two lobe spectra. This composite signal is illustrated in FIG. 5 by the two approximately Gaussian forms 27—28 and 26—29. This figure also depicts forms 23—32 and 24—31 representing the high channel signal 140+$v$ at conductor 204, FIG. 4. The reference characters on these spectrum forms refers to their origins. For example, the spectrum 23—32, FIG. 5, constitutes either of the equal spectra resulting from reflections from illuminated ground areas 23 and 32, FIG. 1.

In FIG. 5 the spectrum crossover frequencies have a separation of $v$ from the reference frequency of 140 kc.p.s. Thus the intersection of spectra 23—32 and 24—31 has a frequency of 140+$v$ and that of spectra 27—28 and 26—29 has a frequency of 140—$v$. The frequency tracker modulating frequency is termed $v'$, so that $$v' = v - \epsilon \quad (6)$$

FIGURE 5 is symmetrical about 140 kc.p.s. and the high and low channel errors $\epsilon$ are in this case equal but of opposite polarity. Therefore when subtracted in difference circuit 164, FIG. 4, the difference output is $2\epsilon$. This quantity, detected and applied to oscillator 177 drives this velocity servomechanism loop until $\epsilon$ is reduced to zero making $v'$ equal to $v$.

FIGURE 6 depicts the case in which both velocity and train errors are zero, but in which an elevation angle error $\epsilon_E$ exists because the antenna is misaligned to the velocity direction in the vertical plane, or more exactly in the plane normal to the aircraft deck plane. If the misalignment depresses the antenna below the velocity direction, the forward beams responsible for the high channel signal produce a lower than normal Doppler difference signal $v_F$ while the aft beams will produce a higher than normal Doppler difference signal $v_A$ in the low channel. The two Doppler difference signals $v_F$ and $v_A$ thus will differ as long as the unbalance persists. The two elevation errors $\epsilon_E$ are equal and have the same sign. They therefore cancel when substracted in circuit 164, FIG. 4. However, when added in circuit 184 their sum is $2\epsilon_E$. Thereafter phase detection in detector 186 employing the lobing rate of 100 c.p.s. as phase reference produces the direct current signal $\epsilon_E$ in conductor 187.

Figure 8:
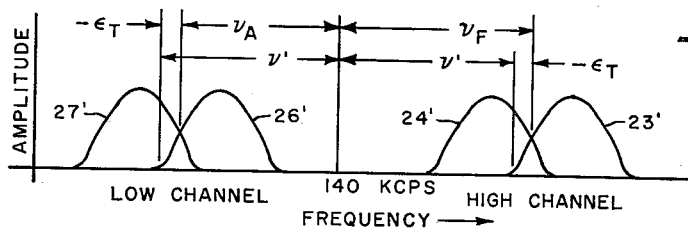

When the speed and elevation servomechanism loops are both nulled and the antenna is aligned properly in elevation but has a train angle error because the antenna is misaligned to the left of the velocity direction, the situation is depicted in FIGS. 7 and 8. During the periods when the left beams are in operation the results are as indicated in FIG. 7. Since the antenna points to the left of the velocity direction the forward left beam returns a lower than normal Doppler difference signal, $v_F$, and the after left beam returns a higher than normal Doppler difference signal $v_A$. Both discriminator errors, $\epsilon_T$, are positive. This is similar to the case of FIG. 6. However, when there is train error the right beam returns are different, and are depicted in FIG. 8 showing the signals received during the periods when the right beams are in operation. In FIG. 8 $v_A$ is less than $v_F$, making the two train errors $\epsilon_T$ both negative. That is to say, in the output of phase detector 186, FIG. 4, in addition to the direct current elevation error signal $\epsilon_E$ there is a component which reverses its polarity at the right-aft beaming rate of 5 c.p.s. When this component is phase detected in detector 191, using the 5 c.p.s. beaming potential as reference, the output in conductor 193 is a direct potential proportional to the train angle error and having polarity representative of error signal. The phase detector error outputs are not interdependent. The velocity error $\epsilon$ at the output of phase detector 171 is independent of antenna misalignment error, and each of the antenna misalignment error signals is independent of the other and of the velocity error signal.

What is claimed is:

1. An aircraft Doppler measuring system comprising, antenna means carried by said aircraft directing a plurality of beams of radiant energy, each of which is composed of a pair of intersecting lobes, toward the earth's surface and receiving Doppler-shifted echo signals therefrom, at least two of said beams being directed toward areas of the earth's surface lying on opposite sides of the ground track and displaced from the plane of said aircraft normal to the velocity vector thereof in a first direction parallel to said ground track, and at least one other beam being directed toward an area of the earth's surface displaced from the plane of said aircraft normal to said velocity vector in a direction opposite to said first direction, means for alternately radiating the respective ones of each of said pairs of intersecting lobes at a first selected frequency, means for alternately radiating the beams directed on opposite sides of the ground track at a second selected frequency, means for deriving Doppler frequency spectra from said reflected echo signals, said spectra being oppositely displaced in frequency relative to a selected base frequency, means for deriving a pair of error signals from said oppositely disposed Doppler frequency spectra, means for subtracting said error signals to produce a difference signal, a phase detector having said difference signal impressed thereon and operated at said first selected frequency producing therefrom a velocity signal, means for adding said error signals to produce a sum signal, a second phase detector having said sum signal impressed thereon and operated at said first selected frequency producing therefrom an elevation signal, and a third phase detector having a signal representative of said sum signal impressed thereon and operated at said second selected frequency producing therefrom a train signal.

2. A system as set forth in claim 1 including a servomechanism means having said train signal impressed thereon orienting said antenna along said ground track and a second servomechanism means having said elevation signal impressed thereon orienting said antenna in a vertical plane to the velocity vector of said aircraft.

3. An aircraft Doppler measuring system comprising, antenna means carried by said aircraft directing at least three beams of radiant energy, each of which is composed of a pair of intersecting lobes, toward the earth's surface and receiving Doppler shifted echo signals therefrom, two of said beams being directed toward areas of the earth's surface lying on opposite sides of the ground track forward of said aircraft and at least one other of said beams being directed toward an area of the earth's surface aft of said aircraft, means for alternately radiating the respective ones of each of said pairs of intersecting lobes at a first selected frequency, means for alternately radiating the beams directed on opposite sides of the ground track at a second selected frequency, means for deriving Doppler frequency spectra from the fore and aft directed beams which are oppositely displaced in frequency relative to a selected base frequency, means for deriving a pair of error signals from said oppositely displaced Doppler frequency spectra, means for subtracting said error signals to produce a difference signal, a phase detector having said difference signal impressed thereon and operated at said first selected frequency producing therefrom a velocity signal, means for adding said error signals to produce a sum signal, a second phase detector having said sum signal impressed thereon and operated at said first selected frequency producing therefrom an elevation signal, and a third phase detector having a signal representative of said signal impressed thereon and operated at said second selected frequency producing therefrom a train signal.

4. A system as set forth in claim 3 including a servomechanism means having said train signal impressed thereon orienting said antenna along said ground track and a second servomechanism means having said elevation signal impressed thereon orienting said antenna in a vertical plane to the velocity vector of said aircraft.

5. An aircraft Doppler measuring system comprising, antenna means carried by said aircraft directing at least three beams of radiant energy, each of which is composed of a pair of intersecting lobes, toward the earth's surface and receiving Doppler shifted echo signals therefrom, two of said beams being directed toward areas of the earth's surface lying on opposite sides of the ground track aft of said aircraft and at least one other of said beams being directed toward an area of the earth's surface forward of said aircraft, means for alternately radiating the respective ones of each of said pairs of intersecting lobes at a first frequency, means for alternately radiating the beams directed on opposite sides of the ground track of a second selected frequency, means for deriving Doppler frequency spectra from the fore and aft directed beams which are oppositely displaced in frequency relative to a selected base frequency, means for deriving a pair of error signals from said oppositely displaced Doppler frequency spectra, means for subtracting said error signals to produce a difference signal, a phase detector having said difference signal impressed thereon and operated at said first selected frequency producing therefrom a velocity signal, means for adding said error signals to produce a sum signal, a second phase detector having said sum signal impressed thereon and operated at said first selected frequency producing therefrom an elevation signal, and a third phase detector having a signal representative of said sum signal impressed thereon and operated at said second selected frequency producing therefrom a train signal.

6. A system as set forth in claim 5 including a servomechanism means having said train signal impressed thereon orienting said antenna along said ground track and a second servomechanism means having said elevation signal impressed thereon orienting said antenna in a vertical plane to the velocity of said aircraft.

7. An aircraft Doppler measuring system comprising, antenna means carried by said aircraft directing four beams of radiant energy, each of which is composed of a pair of intersecting lobes, toward the earth's surface and receiving Doppler shifted echo signals therefrom, two of said beams being directed toward areas of the earth's surface lying on opposite sides of the ground track forward of said aircraft and the other two beams being directed toward areas of the earth's surface lying on opposite sides of the ground track aft of said aircraft, means for alternately radiating the respective ones of each of said pairs of intersecting lobes at a first frequency, means for alternately radiating the beams directed on opposite sides of the ground track at a second selected frequency, means for deriving Doppler frequency spectra from the fore and aft directed beams which are oppositely displaced in frequency relative to a selected base frequency, means for deriving a pair of error signals from said oppositely displaced Doppler frequency spectra, means for subtracting said error signals to produce a difference signal, a phase detector having said difference signal impressed thereon and operated at said first selected frequency producing therefrom a velocity signal, means for adding said error signals to produce a sum signal, a second phase detector having said sum signal impressed thereon and operated at said first selected frequency producing therefrom an elevation signal, and a third phase detector having a signal representative of said sum signal impressed thereon and operated at said second selected frequency producing therefrom a train signal.

8. A system as set forth in claim 7 including a servomechanism means having said train signal impressed thereon orienting said antenna along said ground track and a second servomechanism means having said elevation signal impressed thereon orienting said antenna in a vertical plane to the velocity vector of said aircraft.

9. An aircraft Doppler measuring system comprising, antenna means carried by said aircraft directing a plurality of beams of radiant energy, each of which is composed of a pair of intersecting lobes, toward the earth's surface and receiving Doppler shifted echo signals therefrom, at least two of said beams being directed toward areas of the earth's surface lying on opposite sides of the ground track and displaced from said aircraft in a first direction parallel to said ground track and at least one other beam being directed toward an area of the earth's surface displaced from said aircraft in a second direction parallel to the ground track opposite to said first direction, means for alternately radiating the respective ones of each of said pairs of intersecting lobes at a first selected frequency, means for alternately radiating the beams directed on opposite sides of the ground track at a second selected frequency which is a fraction of said first selected frequency, means for deriving Doppler frequency spectra from the beams displaced in said first and second direction parallel to said ground track which are oppositely displaced in frequency relative to a selected base frequency, means for deriving a pair of error signals from said oppositely displaced frequency spectra, means for adding said error signals to produce a sum signal, a first phase detector having said sum signal impressed thereon and operated at said first selected frequency producing therefrom an elevation signal, and a second phase detector having the output of said first phase detector impressed thereon and operated at said second selected frequency producing therefrom a train signal.

10. An aircraft Doppler measuring system comprising, antenna means carried by said aircraft directing a plurality of beams of radiant energy, each of which is composed of a pair of intersecting lobes, toward the earth's surface and receiving Doppler shifted echo signals therefrom, at least two of said beams being directed toward areas of the earth's surface lying on opposite sides of the ground track and displaced from said aircraft in a first direction parallel to said ground track and at least one other beam being directed toward an area of the earth's surface displaced from said aircraft in a second direction parallel to the ground track opposite to said first direction, means for alternately radiating the respective ones of each of said pairs of intersecting lobes at a first selected frequency, means for alternately radiating the beams directed on opposite sides of the ground track at a second selected frequency which is a fraction of said first selected frequency, means for deriving Doppler frequency spectra from the beams displaced in said first and second directions parallel to said ground track which are oppositely displaced in frequency relative to a selected base frequency, means for deriving a pair of error signals from said oppositely displaced frequency spectra, means for subtracting said error signals to produce a difference signal, a first phase detector operated at said first selected frequency having said difference signal impressed thereon and producing a velocity signal therefrom, means for adding said errors signals to produce a sum signal, a second phase detector operated at said first selected frequency having said sum signal impressed thereon and producing an elevation signal therefrom, and a third phase detector operated at said second selected frequency having the output of said second phase detector impressed thereon and producing a train signal therefrom.

11. An aircraft Doppler measuring system comprising, antenna means carried by said aircraft directing four beams of radiant energy, each of which is composed of a pair of intersecting lobes, toward the earth's surface and receiving Doppler shifted echo signals therefrom, two of said beams being directed toward areas of the earth's surface lying on opposite sides of the ground track forward of said aircraft and the other two beams being directed toward areas of the earth's surface lying on opposite sides of the ground track aft of said aircraft, means for alternately radiating the respective ones of said pairs of intersecting lobes at a first selected frequency, means for alternately radiation the beams directed on opposite sides of the ground track at a second selected frequency which is a fraction of said first selected frequency, means for deriving Doppler frequency spectra from the fore and aft directed beams which are oppositely displaced in frequency relative to a selected base frequency, means for deriving a pair of error signals from said oppositely displaced frequency spectra, means for adding said error signals to produce a sum signal, a first phase detector operated at said first selected frequency having said sum signal impressed thereon and producing an elevation signal therefrom, and a second phase detector operated at said second selected frequency having the output of said second phase detector impressed thereon and producing a train signal therefrom.

12. An aircraft Doppler measuring system comprising, antenna means carried by said aircraft directing four beams of radiant energy, each of which is composed of a pair of intersecting lobes, toward the earth's surface and receiving Doppler shifted echo signals therefrom, two of said beams being directed toward areas of the earth's surface lying on opposite sides of the ground track forward of said aircraft and the other two beams being directed toward areas of the earth's surface lying on opposite sides of the ground track aft of said aircraft, means for alternately radiating the respective ones of each of said pairs of intersecting lobes at a first selected frequency, means for alternately radiating the beams directed on opposite sides of the ground track at a second selected frequency which is a fraction of said first selected frequency, means for deriving Doppler frequency spectra from the fore and aft directed beams which are oppositely displaced in frequency relative to a selected base frequency, means for deriving a pair of error signals from said oppositely displaced frequency spectra, means for subtracting said error signals to produce a difference signal, a first phase detector operated at said first selected frequency having said difference signal impressed thereon and producing a velocity signal therefrom, means for adding said error signals to produce a sum signal, a second phase detector operated at said first selected frequency having said sum signal impressed thereon and producing an elevation signal therefrom, and a third phase detector operated at said second selected frequency having the output of said second phase detector impressed thereon and producing a train signal therefrom.

13. An aircraft Doppler measuring system comprising, antenna means carried by said aircraft for radiating and receiving a plurality of microwave beams, means stabilizing said antenna in the aircraft velocity direction, receiver-transmitter means connected to said antenna means and emitting in a single channel a received signal including at least two Doppler frequency spectra occupying displaced frequency bands derived from said received beams, zero-frequency tracker means containing high-channel and low-channel resonant discriminators receiving said received signal, said high-channel resonant discriminator accepting the higher frequency of said two Doppler frequency spectra and emitting a first error signal, said low-channel resonant discriminator accepting the lower frequency of said two Doppler frequency spectra and emitting a second error signal, a difference circuit subtracting said first and second error signals to form a speed error signal, an oscillator, control means including a multiplier, phase detector and double integrator controlling the frequency of said oscillator, said oscillator emitting a signal having a frequency representing aircraft speed in said velocity direction and two other signals having other frequencies demodulating said discriminator channel signals respectively, and control means including a circuit summing said first and second error signals and including phase detectors emitting elevation and train angle error signals controlling said antenna stabilization means.

14. An aircraft Doppler measuring system comprising, antenna means carried by said aircraft radiating and receiving a plurality of microwave beams alternately to right and left of the ground track of said aircraft, each said beam being composed of two intersecting lobes alternately radiated, means stabilizing said antenna means in the direction of aircraft velocity, beaming and lobing frequency generators controlling said antenna means, receiver-transmitter means connected to said antenna means and emitting in a single circuit a received signal having a base reference frequency with at least two sidebands representing Doppler frequency spectra derived from respective ones of said microwave beams, two-channel discriminator means receiving said received signal from said single circuit and emitting two error signals, sum and difference circuits each receiving said two error signals, control means including a first phase detector actuated from said difference circuit emitting a control signal, said first phase detector employing said lobing generator as phase reference, a demodulating generator controlled by said control signal applying two demodulating signals to said discriminator means and emitting a signal representative of aircraft speed in its velocity direction, and stabilization control means including a phase detector employing said lobing generator as a phase reference and a phase detector employing said beaming generator as a phase reference, said stabilization control means being actuated from said sum circuit and emitting two error signals controlling said antenna stabilization means.

15. An aircraft Doppler measuring system comprising, antenna means carried by said aircraft radiating and receiving a plurality of microwave forward and aft beams downward alternately to the right and left of the velocity direction of the aircraft, each of said beams consisting of two intersecting lobes alternately radiated, means stabilizing said antenna means in the direction of aircraft velocity, beaming generator means controlling the frequency of said right-left beam alternations, lobing generator means controlling the frequency of said lobing alternations, receiver-transmitter means connected to said antenna means emitting in a single circuit a plurality of signals having frequency differences relative to a base reference datum frequency and respectively equal to the Doppler difference spectra received in said several lobes, a frequency tracker including two-channel discriminator means receiving said plurality of signals in said single circuit and emitting two error signals, sum and difference circuits each receiving said two error signals, a phase detector demodulating the output of said difference circuit having the signal of said lobing generator applied thereto as a phase reference, an integrator integrating the output of said phase detector, a generator controlled by said integrator output applying two difference demodulating signals to said two channels of the discriminator means respectively and emitting a signal having a frequency representing aircraft speed in its velocity direction, and stabilization control means actuated from said sum circuit including a phase detector referenced to said lobing frequency and phase and a phase detector referenced to said beaming frequency and phase, said stabilization control means emitting elevation and train angle error signals controlling said antenna stabilization means.

16. An aircraft Doppler measuring system comprising, a lobing generator generating a control signal having a lobing frequency, a beaming generator generating a control signal having a beaming frequency, a microwave antenna carried by said aircraft radiating at least three dual beams toward the earth alternately to right and left of the aircraft velocity direction at said beaming frequency and phase, at least one beam being radiated forward at least one beam being radiated aft, each beam being composed of two intersecting lobes alternating at said lobing frequency and phase, means stabilizing said antenna to the aircraft velocity direction, a receiver-transmitter connected to said antenna emitting received signals in a single channel, said received signals comprising a frequency spectrum derived from the received signal of each of said lobes, said spectra having frequencies lying above and below a base reference datum frequency by the Doppler difference frequency information in said lobe radiation, a frequency tracker comprising a high channel resonant discriminator and a low-channel resonant discriminator, said discriminators being connected to said single channel, said high channel resonant discriminator accepting and coherently discriminating said spectra above the base reference datum frequency to form a first error signal and said low-channel resonant discriminator accepting and coherently discriminating said spectra below the base reference datum frequency to form a second error signal, sum and difference circuits each receiving said first and second error signals and emitting sum and difference error signals, a multiplier circuit multiplying said difference error signal by a factor proportional to aircraft speed, a first phase detector operated at said lobing generator frequency and phase receiving said multiplier circuit output, a double integrator doubly integrating the output of said phase detector, a generator controlled by said integrated output applying two demodulating signals of different frequencies to said high-channel and low-channel discriminators respectively and generating an output signal having a frequency representative of aircraft speed in its velocity direction, a second phase detector detecting said sum error signal operated at the frequency and phase of said lobing generator and emitting an elevation angle error signal, a third phase detector detecting said elevation angle error signal operated at the frequency and phase of said beaming generator and emitting a train angle error signal, and servomechanism means applying said elevation and train error signals to said antenna stabilization means.

17. An aircraft Doppler measuring system comprising, a lobing generator generating a control signal having a lobing frequency, a beaming generator generating a control signal having a beaming frequency of the order of one tenth of said lobing frequency, a microwave antenna carried by said aircraft, means stabilizing the major axis of said antenna in the aircraft velocity direction, means connecting said lobing and beaming generators to said antenna, said antenna radiating four dual beams downward toward the earth, two of said beams pointing toward the right of said velocity direction alternating at said beaming frequency with the other two of said beams pointing toward the left of said velocity direction, one of said two right beams and one of said two left beams pointing forward and the remainder backward, each dual beam consisting of two intersecting lobes alternately radiated at said lobing rate whereby calibration shifts are minimized and a dual signal element is provided for error direction sensing, a receiver-transmitter connected to said antenna receiving microwave signals therefrom representing the eight lobe radiation echoes, said receiver-transmitter emitting a signal in a single channel containing Doppler frequency spectra representing said eight lobe signals, said spectra being above and below a base reference datum frequency by the amounts of the respective Doppler differences, said receiver-transmitter emitting a second signal in a second channel having only said base reference datum frequency, a frequency tracker comprising a high-channel resonant discriminator and a low-channel resonant discriminator each of which is connected to said single channel, said high-channel resonant discriminator containing a mixer receiving a first demodulating signal having said base reference datum frequency plus a Doppler derived frequency, said mixer emitting a nominally zero frequency difference signal, a low-pass filter receiving said difference signal, a detector demodulating said filtered signal to form a first error signal, said low-channel resonant discriminator containing a second mixer receiving a second demodulating signal having said base reference datum frequency minus said Doppler derived frequency and emitting a second nominally zero difference signal, a low-pass filter receiving said second difference signal, a detector demodulating said filtered second difference signal to form a second error signal, a subtracting circuit subtracting said first and second error signals to form a difference error signal, a multiplying circuit multiplying said difference error signal by a velocity signal to form a product signal, a first phase detector circuit operated at the frequency and phase of said lobing generator detecting said product signal to form a direct current error signal, a double integration circuit doubly integrating said direct current error signal to form a velocity signal having potential proportional to aircraft speed, means applying said velocity signal to said multiplying circuit, a generator, means applying said velocity signal to said generator whereby said first demodulating signal is formed, a dual single sideband generator, means applying said second signal in said second channel to said single sideband generator, means applying said first demodulating signal to said dual single sideband generator to form an output signal having said Doppler derived frequency, means deriving from said dual single sideband generator said second demodulating signal, an adding circuit adding said first and second error signals to form a sum error signal, a second phase detector operated at the frequency and phase of said lobing generator detecting said sum error signal to form an elevation angle error signal, a third phase detector operated at the frequency and phase of said beaming generator detecting said elevation angle error signal to form a train angle error signal, and servomechanism means applying said elevation and train angle error signals to said antenna stabilization means whereby said angle error signals are reduced to zero.

No references cited.